April 7, 1953 — C. W. GELDBAUGH — 2,633,905
EMERGENCY KIT INSERT FOR AUTOMOBILE SEATS
Filed July 5, 1949
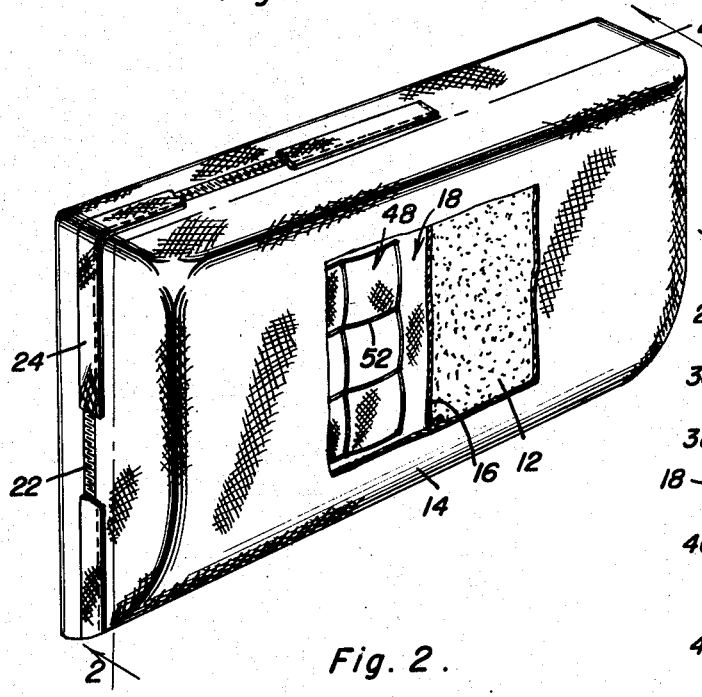
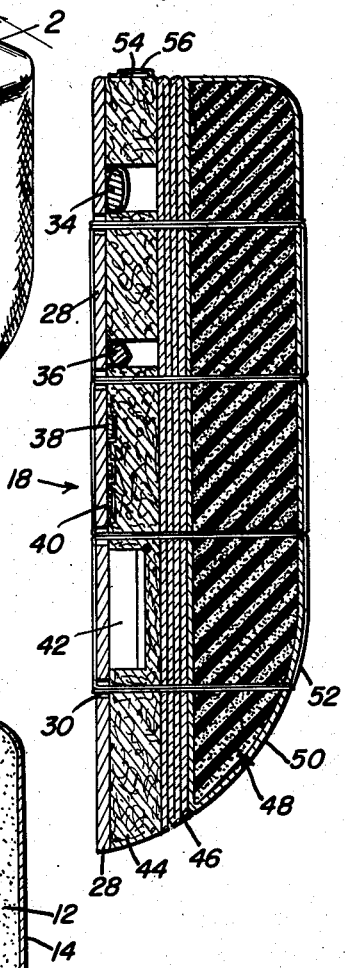
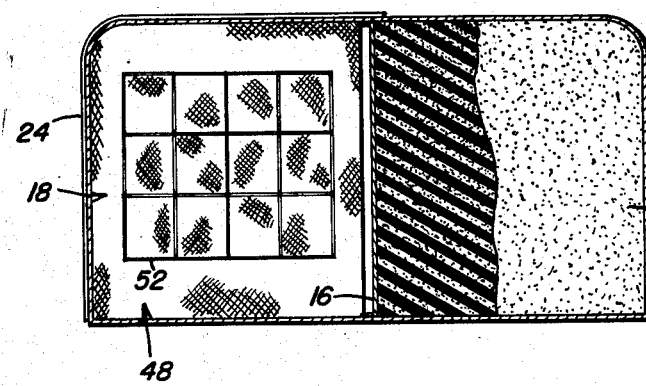
Inventor
Cecil W. Geldbaugh
By Clarence A. O'Brien and Harvey B. Jacobson
Attorneys April 7, 1953     C. W. GELDBAUGH     2,633,905
EMERGENCY KIT INSERT FOR AUTOMOBILE SEATS
Filed July 5, 1949     2 SHEETS—SHEET 2
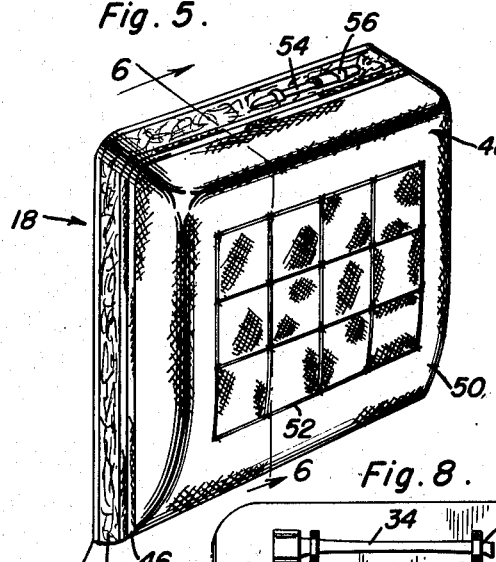
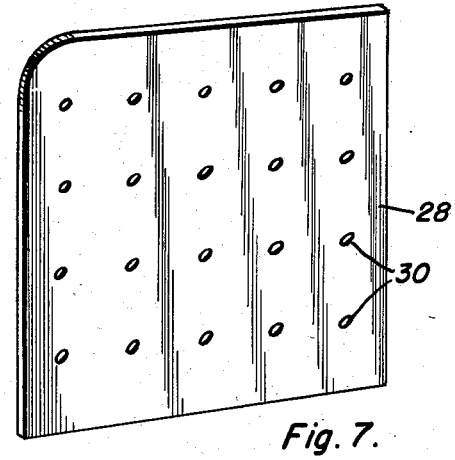
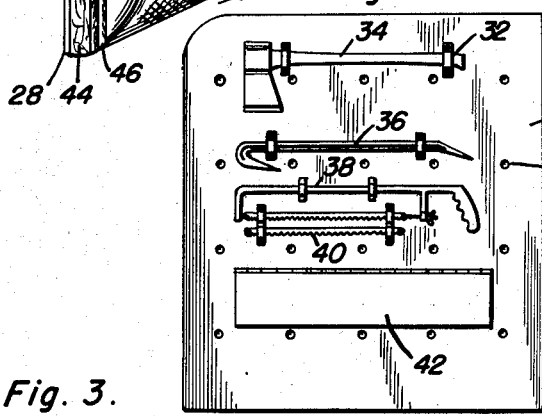
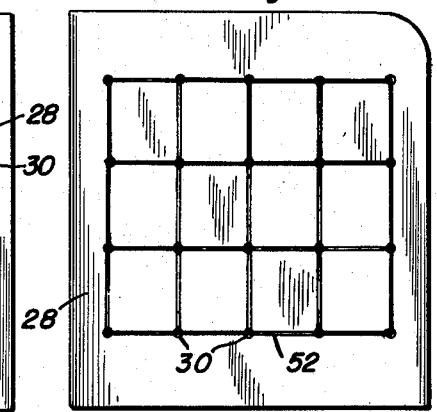
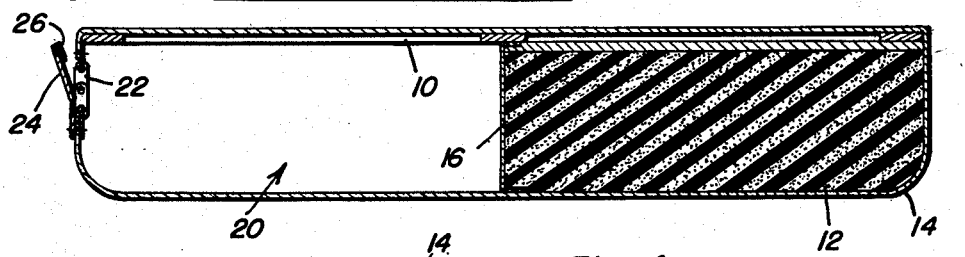
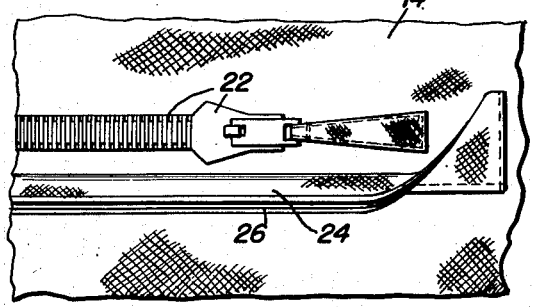
Inventor
Cecil W. Geldbaugh Patented Apr. 7, 1953

2,633,905

UNITED STATES PATENT OFFICE 2,633,905

EMERGENCY KIT INSERT FOR AUTOMOBILE SEATS

Cecil W. Geldbaugh, Rocky River, Ohio

Application July 5, 1949, Serial No. 103,136

2 Claims. (Cl. 155—188)

This invention relates generally to first aid equipment and more particularly to an emergency kit which is insertable into an automobile seat and releasable from the seat in an emergency.

A primary object of this invention is to provide a kit which is releasably insertable in an automobile seat, in such a manner that the seat is usable in the ordinary manner, while the kit is easily removed by unfastening a portion of the cover of the automobile seat, the kit being designed to be useful not only in the event of a traffic accident involving the automobile wherein the kit is mounted but also useful in the event of an emergency involving another vehicle.

An important feature of this invention is the provision of means for releasing the kit with ease and celerity.

Another object of this invention is to provide a kit which is designed for replacement by another kit which has been packed ready for insertion in an automobile seat, the reconditioning of used kits being ordinarily possible, although it is proposed that such reconditioning will be carried out directly or indirectly by firms handling the sale of automobile accessories, although it is understood that reconditioning and repacking of a used kit could be accomplished by the individual owner of the automobile.

Another object of this invention, basic in character, is to provide means for adding to the comfort and well being of injured persons, prior to the arrival of ambulance equipment and personnel.

Yet another object of this invention is to provide an emergency kit which is designed so as to be preserved in readiness for emergencies, the kit being very easily released and unpacked ready for use, while being poorly adapted for use in picnicking and the like, in order that such use will be discouraged.

And a last object to be mentioned specifically is to provide a device of the character mentioned which will be practicable and economical to manufacture, simple and safe to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a three dimensional view of the assembled seat with the kit in place;

Figure 2 is a vertical sectional view, taken substantially upon the line 2—2 in Figure 1;

Figure 3 is a horizontal sectional view of the seat adapted for use with this invention but having the actual kit removed;

Figure 4 is a fragmentary plan view of a portion of the outside cover, or main cover, of the seat, the elongated flap which is fastened thereto being shown as folded back to allow access to the zipper fastener;

Figure 5 is a three dimensional view of the assembled kit;

Figure 6 is a vertical sectional view of the assembled kit, the view being taken substantially on the line 6—6 in Figure 5;

Figure 7 is a rear view of the kit illustrated in Figures 5 and 6;

Figure 8 is a front elevational view of the inflexible panel of the kit with the tools and first aid equipment container mounted thereon;

Figure 9 is a three dimensional view of the inflexible rear panel of the kit.

Similar characters of reference designate similar or identical elements and portions throughout the specification and throughout the different views in the drawings.

Referring now to the drawings in detail, this invention includes an automobile seat having a main frame 10, cushion structure 12, and a main cover 14 for the complete seat, or at least that portion of the seat concerned in this disclosure, which will ordinarily be limited to the upholstered back. According to this invention, the seat will have a vertical partition 16, and the cushion structure 12 will occupy a space on one side of the partition 16 while the emergency kit, generally indicated at 18, will occupy the space indicated at 20 in Figure 3, on the other side of the partition 16. A zipper fastener 22 or similar device will be used to close a slit opening in the cover 14, extending along the top and one side of the cover, the purpose of this structure being, of course, to allow the extraction of the kit 18. A flap 24 of elongated shape and constructed of flexible material will be sewn or otherwise suitably secured to cover the zipper fastener assembly, and it is preferred that an elastic member 26 be provided on the flap 24 to hold the flap in position.

An inflexible panel 28 comprises the rear panel of the kit 18 and this panel has a plurality of radially spaced apertures 30. A plurality of cleats 32 are mounted upon the front side of the panel 28 for the removable mounting therein of tools such as an axe 34, pinch bar 36, hacksaw 38 and an extra blade therefor 40, and this panel will also preferably support a container 42 for first aid equipment such as bandages and medicaments.

One or more pieces of thick felt 44 or other pad material will be secured to the front side of the panel 28 between and around the tools and the container 42, and a blanket 46 will be folded and positioned over the padding 44. Finally the kit will be provided with a cushion, generally indicated at 48 and preferably constructed of a suitable filler such as foam rubber or the like with a sheath 50. The above mentioned parts of the kit will be held together by binding cords 52 laced through the apertures 30 in the rear panel 28, through the padding 44 and blanket 46 and through the cushion 48, in a manner which will be clearly understood from an inspection of Figures 1, 5, 6 and 7. The binding cords 52 will preferably be laced in such a manner as to provide a quilting of the cushion 48, so that the form of the kit will be satisfactorily maintained during long periods of use as a seat back.

A knife having a blade 54 will be mounted upon the top of the kit 18 by some such means as the retaining loops 56, and the operation of this invention will be clearly understood from a consideration of the foregoing description of the mechanical details thereof, taken in connection with the drawings and the above recited objects of this invention. In recapitulation, it might be added that the flap 24 can be folded back to expose the zipper fastener 22, and when the kit has been removed, the knife blade 54 will be used to sever the binding cords 52 on the rear side of the rear panel 28, thus releasing and exposing all of the parts of the kit for instant use in an emergency.

Obviously minor variation from the embodiment disclosed herein may be resorted to without departure from the spirit of this invention, as defined by the appended claims.

Having described the invention, what is claimed as new is:

1. An emergency kit for removable insertion in an automobile seat back having fixed cushion structure extending partially across the front of said seat back, comprising a blanket and a cushion and having a general shape corresponding with said fixed cushion structure and being complementary to said fixed cushion structure, said kit further including an inflexible back panel, shanks of tools removably mounted on said back panel and comprising reinforcing means for said panel, padding between said shanks and secured to said panel, said blanket abutting said padding, said cushion abutting said blanket, said panel having apertures, and binding cords laced through said apertures, padding, blanket and cushion.

2. A seat back for an automobile comprising a main frame, fixed cushion structure extending partially across the front of said frame, an emergency kit having a resilient forward portion and a general shape corresponding with said fixed cushion structure and complementary thereto, a main cover extending over both said fixed cushion structure and said kit, said covering having a slit opening therein for insertion and removal of said kit, said resilient forward portion of the kit comprising a blanket and a cushion, and said kit also including an inflexible back panel, shanks of tools removably mounted on said back panel and comprising reinforcing means for said panel, padding between said shanks and secured to said panel, said blanket abutting said padding, said cushion abutting said blanket, said panel having apertures, and binding cords laced through said apertures, padding, blanket and cushion.

CECIL W. GELDBAUGH.

REFERENCES CITED

The following references are of record in the file of this patent:

UNITED STATES PATENTS

| Number | Name | Date |
| --- | --- | --- |
| 1,245,244 | Lavezzi | Nov. 6, 1917 |
| 2,294,039 | Looney | Aug. 25, 1942 |
| 2,429,050 | Decker | Oct. 14, 1947 |

FOREIGN PATENTS

| Number | Country | Date |
| --- | --- | --- |
| 440,458 | Germany | Feb. 8, 1927 |

OTHER REFERENCES

Motor Vehicle Monthly, July 1923, page 37.